(12) United States Patent
Billington et al.

(10) Patent No.: US 7,637,656 B2
(45) Date of Patent: Dec. 29, 2009

(54) TEMPERATURE MEASUREMENT USING CHANGES IN DIELECTRIC CONSTANT AND ASSOCIATED RESONANCE

(75) Inventors: Scott Billington, Mableton, GA (US); Jonathan Geisheimer, Atlanta, GA (US); Thomas Holst, Atlanta, GA (US)

(73) Assignee: Radatec, Inc., Atlanta, GA (US)

( * ) Notice: Subject to any disclaimer, the term of this patent is extended or adjusted under 35 U.S.C. 154(b) by 154 days.

(21) Appl. No.: 11/787,021

(22) Filed: Apr. 13, 2007

(65) Prior Publication Data

US 2008/0175300 A1   Jul. 24, 2008

Related U.S. Application Data

(60) Provisional application No. 60/791,810, filed on Apr. 13, 2006.

(51) Int. Cl.
*G01K 1/00* (2006.01)
*G01K 11/00* (2006.01)
*G01K 3/00* (2006.01)

(52) U.S. Cl. ............... 374/120; 374/117; 374/104; 374/122; 702/130

(58) Field of Classification Search .............. 374/120, 374/117, 104, 122; 702/130
See application file for complete search history.

(56) References Cited

U.S. PATENT DOCUMENTS 4,568,200 A * 2/1986 Hatono et al. .......... 374/122
6,489,917 B2 12/2002 Geisheimer et al.
6,856,281 B2 2/2005 Billington et al.
2008/0159353 A1 7/2008 Bosselmann et al.

FOREIGN PATENT DOCUMENTS

WO   WO 2006042807 A1 * 4/2006

OTHER PUBLICATIONS

International Search Report, PCT/US2007/009263, Sep. 17, 2008.

* cited by examiner

*Primary Examiner*—Gail Verbitsky
*Assistant Examiner*—Mirellys Jagan
(74) *Attorney, Agent, or Firm*—King & Spalding LLP

(57) ABSTRACT

A temperature measurement technique for calculating a temperature in a high temperature environment by monitoring a change in resonant frequency of a resonant structure loaded with a dielectric material. A response curve for a reflection coefficient S11 associated with the resonant structure is generated, typically by the use of a network analyzer connected to the resonant structure via a cable. A minimum point for the response curve is identified to detect the resonant frequency for the resonant structure. A calibration map is applied to the minimum point to identify a temperature associated with the resonant frequency of the resonant structure. The temperature associated with the resonant frequency of the resonant structure represents the temperature of the high temperature environment.

18 Claims, 5 Drawing Sheets

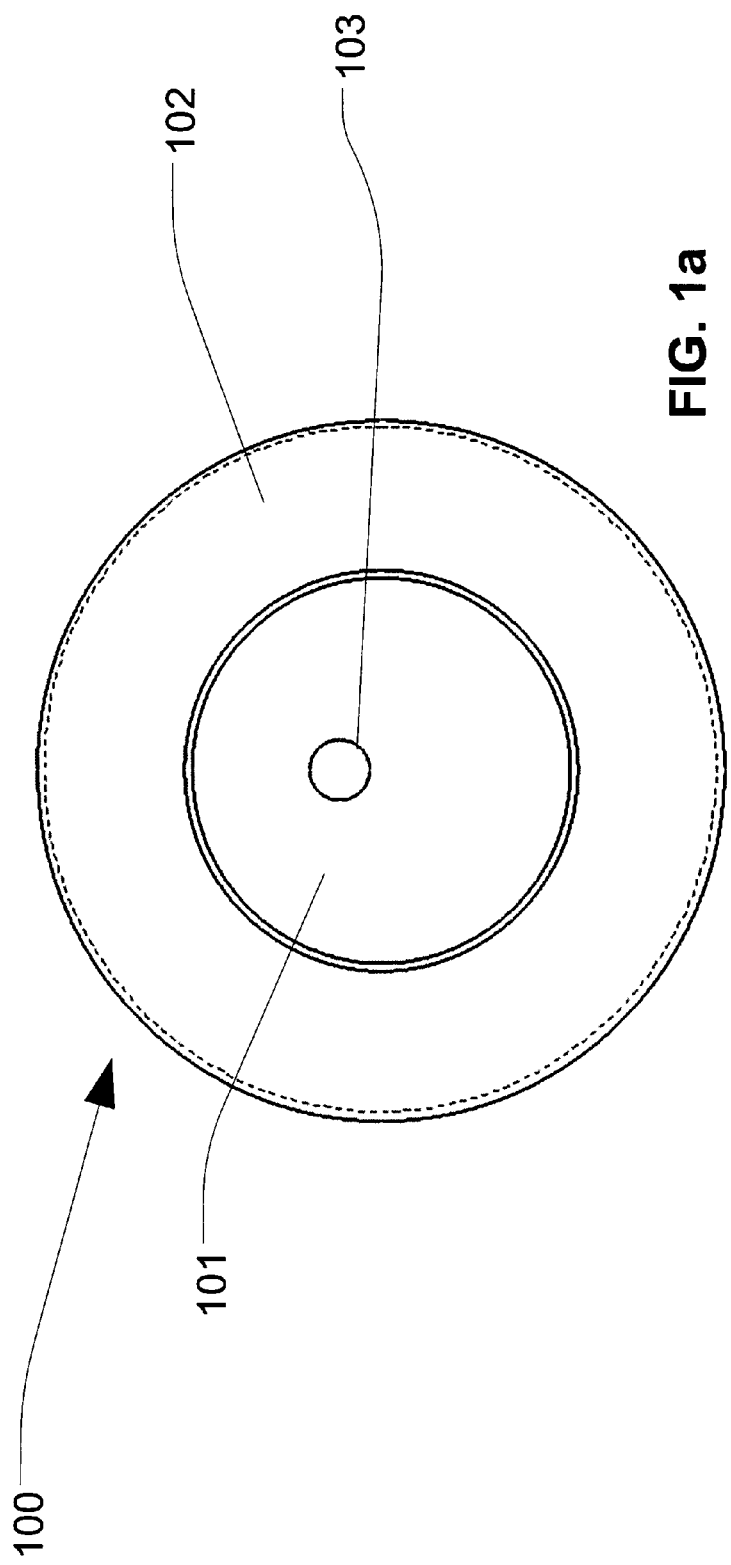
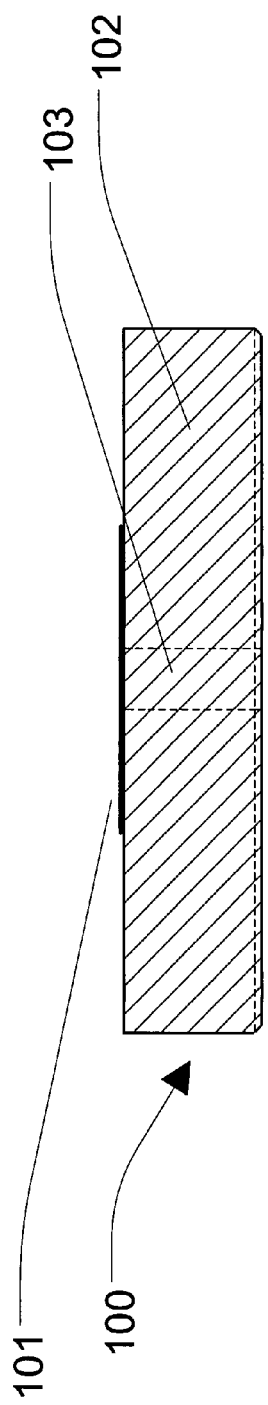
FIG. 1a
FIG. 1b

TEMPERATURE MEASUREMENT USING CHANGES IN DIELECTRIC CONSTANT AND ASSOCIATED RESONANCE

RELATED APPLICATION

Applicants claim priority under 35 U.S.C. 119 to an earlier-filed provisional patent application, U.S. Provisional Patent Application Ser. No. 60/791,810, filed on Apr. 13, 2006, entitled "Measuring Temperature Via Center Frequency Drift". The subject matter disclosed by this provisional patent application is fully incorporated within the present application by reference herein.

TECHNICAL FIELD

The present invention relates to temperature measurement and more particularly to the design and use of a temperature measurement device within high temperature environments.

BACKGROUND OF INVENTION

Temperature measurement is normally performed by measuring the change in some quantity proportional to temperature. Most often in industrial environments, this is performed using a thermocouple. A thermocouple will use the voltage difference between two dissimilar metals and map that voltage to a temperature using a calibration curve. Other measurement techniques may use spectral emissivity, while other temperature measurement devices, such as the standard thermometer, will measure the expansion of a liquid or metal as the temperature changes.

Gas turbine engines provide some of the hottest environments for temperature measurement. Gas path temperatures can exceed 2000° F., which is beyond the melting points of most metals. U.S. Pat. No. 6,489,917 to Geisheimer et al. discloses microwave techniques for measuring other physical parameters within a gas turbine engine, such as blade tip clearance.

Antennas that operate within an extreme temperature environment, such as a gas turbine engine environment, normally use some type of active cooling. Nearly all of the components in the turbine area of the engine contain some type of active cooling since the gas path temperature is normally hotter than the melting point of the metals. The cooling air is normally provided by air taken out of the compressor and ducted through the outside of the turbine case as well as through the blades themselves. Therefore, a ready source of cooling air is available, and the antenna installation is typically designed to use some of the cooling air in order to keep the antenna at temperature that will allow it to function for many thousands of hours.

The cooling air design is performed by creating a thermal model or performing thermal calculations that make assumptions about the gas path temperature, the cooling air temperature and pressure, as well as the rate at which heat is transferred from the gas path to the turbine wall. Typical design values represent worse case scenarios and therefore, it can be difficult to accurately determine the operating temperature of the probe.

Embedding thermocouples or other temperature measurement devices within the antenna is possible, however, it represents additional complexity. Often, space is at a premium and routing out another wire as well as dealing with reliability issues of operating at a thermocouple at such high temperature is undesirable. Therefore, it is desirable to derive a technique to measure temperature using the existing antenna structure.

Antennas are used to transmit and receive electromagnetic energy. Typically, they are used within ambient temperature environments and are used in such devices as mobile phones, radios, global positioning receivers, and radar systems. One particular type of antenna, known as a microstrip or patch antenna, is made by forming a geometric pattern of metal on a dielectric substrate. Many such designs are constructed with printed circuit board etching processes common in circuit board manufacture. The geometry of the design is typically rectangular or circular, but other geometries are possible to provide enhanced performance such as increased bandwidth or directionality.

The materials used as the dielectric substrate for an antenna are often circuit board materials, such as FR4, or other ceramic materials such as alumina (Coors AD-995 or similar). All dielectric materials exhibit some change in dielectric constant as a function of temperature. The center frequency of a patch antenna is based on a designed resonance frequency that is a function of the metallization geometry as well as the dielectric constant. For most dielectric materials, the change in dielectric constant is non-linear as a function of temperature, with the rate of change of the dielectric constant increasing as the temperature increases.

The center frequency of the antenna can be measured using a network analyzer, or other similar measurement device, that measures the amount of energy transmitted by the antenna. The typical measurement method measures the antenna reflection coefficient, which consists of transmitting a signal down a cable and measuring the amount of energy that is returned. If the energy is not returned, then it is assumed that most of it passed out through the antenna and is not returned. The reflection coefficient is measured across a range of frequencies to determine the frequency where the antenna most efficiently transmits.

For most antenna applications, the temperature of operation is low enough that the change in dielectric constant temperature does not significantly impact how the antenna functions. However, in applications such as measuring tip clearance inside gas turbine engines, the temperature change can be high enough that significant changes in the dielectric constant can be seen.

In view of the foregoing, it will be appreciated that that the act of measuring the temperature level faced by an antenna located within a high temperature environment requires a different approach than that found in the prior art. Thus, a heretofore unaddressed need exists in the industry to address the aforementioned deficiencies and inadequacies.

SUMMARY OF INVENTION

The present invention implements a methodology for measuring temperature within high temperature environments by recognizing the change in dielectric constant of a resonant device, such as a patch antenna, with the use of appropriate microwave electronics, such as a network analyzer. The inventive technique is typically implemented with a patch antenna or other similar dielectric-based antenna, having an antenna radiating element and a dielectric substrate, typically placed within a housing or probe assembly. The inventive technique can also be extended for operation, however, with other types of resonant structures having dielectric materials such as dielectric windows, waveguide-filled dielectrics, or any other similar structure. The dielectric material can be any material that is compatible with the operating environments of the application and could be a ceramic or plastic-based dielectric material.

For a temperature measurement scenario including an antenna operating in a high temperature environment, the antenna is attached, normally via a microwave cable, to microwave electronics capable of sending an electromagnetic signal down the cable at a plurality of frequencies and measuring the amount of energy returned via the cable. The electronics are typically equipped with analog or digital signal processing capable of recording the amount of energy reflected back down the cable, relating the reflected energy to the amount of energy that was transmitted and developing a graph or report showing the reflection coefficient as a function of frequency. The electronics, typically a network analyzer, includes sufficient signal processing capability for calculating the point on a reflection coefficient graph where the least amount of energy is returned back to the electronics and identifying the frequency of operation. For a representative example, the electronics can store a calibration curve that maps the center frequency of the antenna to the temperature of operation. A temperature can then be calculated from the current antenna center frequency and outputted to the user via a display, digital, or analog technique.

A representative temperature measurement process comprises calculating a temperature for an antenna operating in a high temperature environment. The transmit frequency of the antenna is swept with an electromagnetic signal source and characteristics of the return signal are collected, typically with the support of a network analyzer. These characteristics include in-phase and quadrature waveforms extracted from the returned signal that is reflected from the antenna and received by a receiver or collection device. A complex inverse Fourier transform is performed on the waveforms to transform the recorded voltage versus frequency data from the frequency domain to the time domain. To reduce side lobes, standard Fourier transform windowing can be performed on the recorded data. The data resulting from an application of the Fourier transform represents the magnitude and phase versus time for the reflections associated with the reflection signal. In turn, the antenna reflection of interest is selected—the reflection associated with the antenna rather than the reflections associated with the cabling or connections of the antenna system—and the remaining reflections are removed from the resultant data. The resultant data is then transformed from the time domain to the frequency domain, thereby resulting in a reflection coefficient S11 for the antenna. A minimum point for the response curve represented by the reflection coefficient S11 is detected to locate the center frequency for the antenna. Finally, a calibration map or curve is applied to the detected minimum point to identify a temperature associated with the center frequency of the antenna. The response curve and the results of the application of the calibration map to the response curve can be presented to a user via a display, printed report or other presentation media.

Other systems, methods, features, and advantages of the present invention will be apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of exemplary embodiments of the present invention. Moreover, in the drawings, reference numerals designate corresponding parts throughout the several views.

FIG. 1a is the top view of an exemplary implementation of a patch antenna with metallization applied using a thick film or thin film process in accordance with one embodiment of the present invention.

FIG. 1b is the side view of an exemplary implementation of a patch antenna with metallization applied using a thick film or thin film process in accordance with one embodiment of the present invention.

DETAILED DESCRIPTION OF THE EXEMPLARY EMBODIMENTS

Exemplary embodiments of the present invention provide for a method of measuring temperature by measuring the change in dielectric constant of an antenna having a dielectric material and a radiating element, typically a patch antenna, within a high temperature environment. For the purpose of this disclosure, a high temperature environment is defined by an environment having a temperature of or greater than 600° F.

Figure 2:
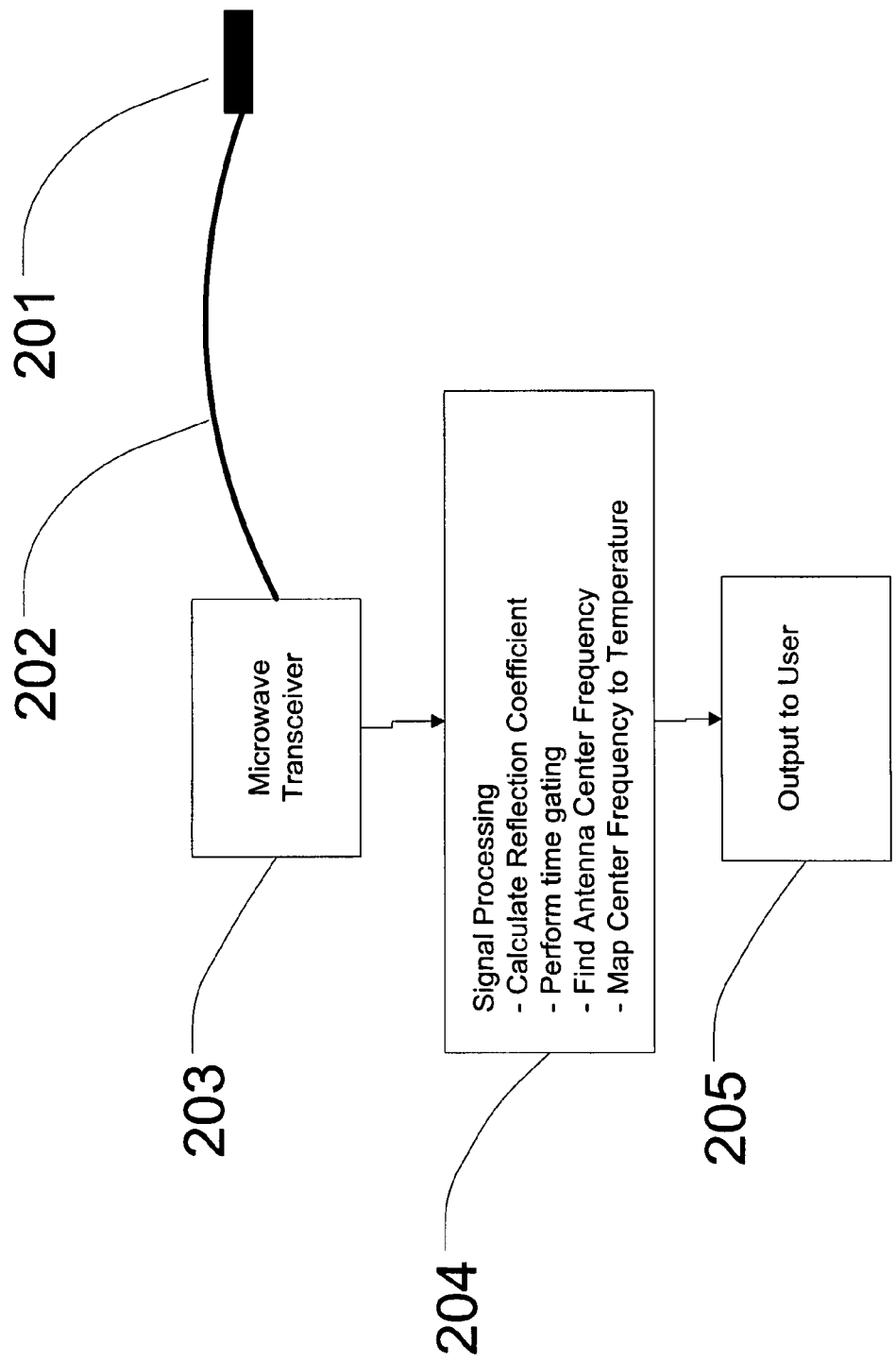
FIG. 2 is a system block diagram illustrating a representative measurement system comprising microwave electronics with digital signal processing attached to a cable and antenna in accordance with one embodiment of the present invention.
Figure 3:
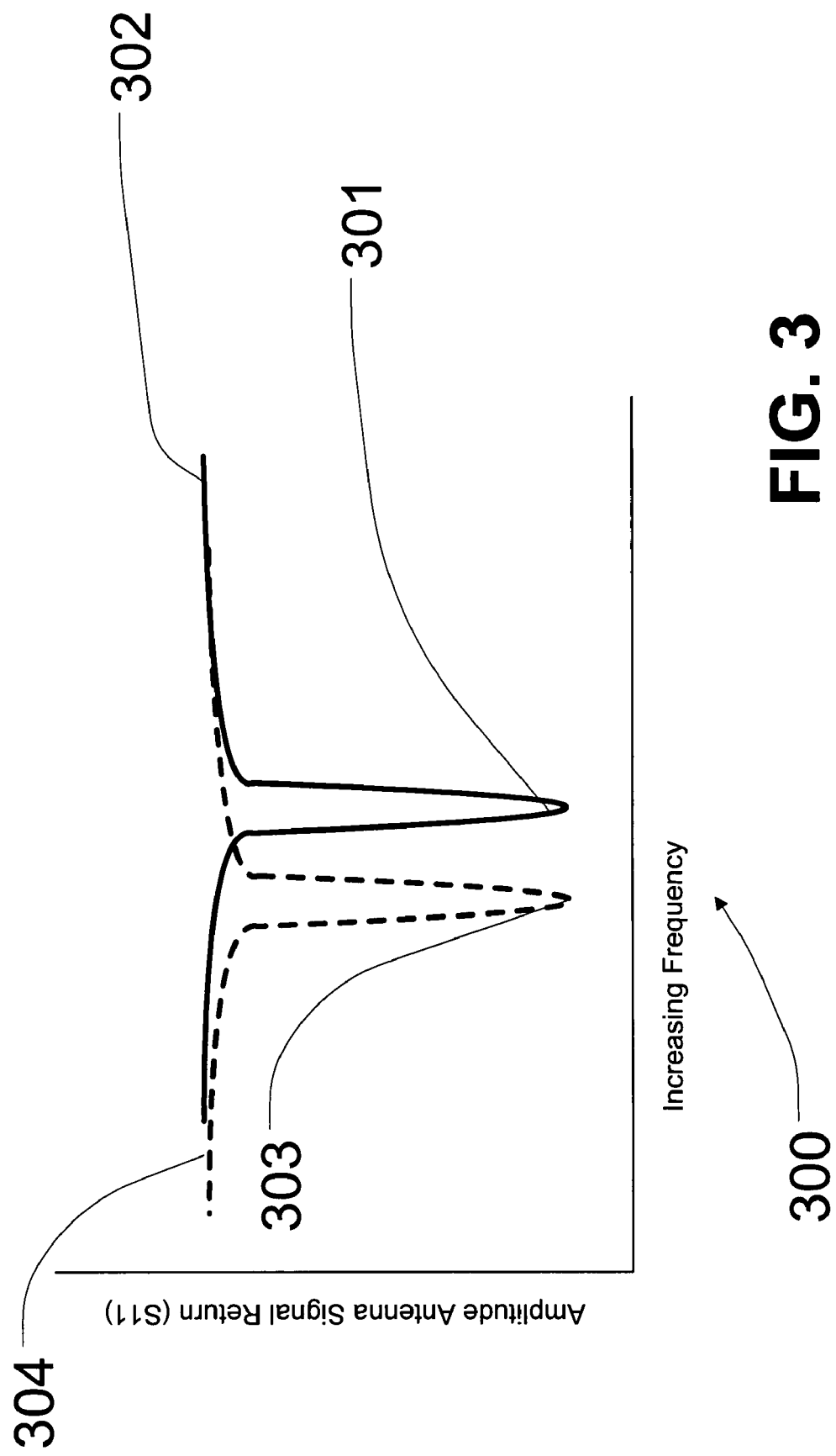
FIG. 3 is a typical reflection coefficient plot for a typical patch antenna in accordance with one embodiment of the present invention.
Figure 4:
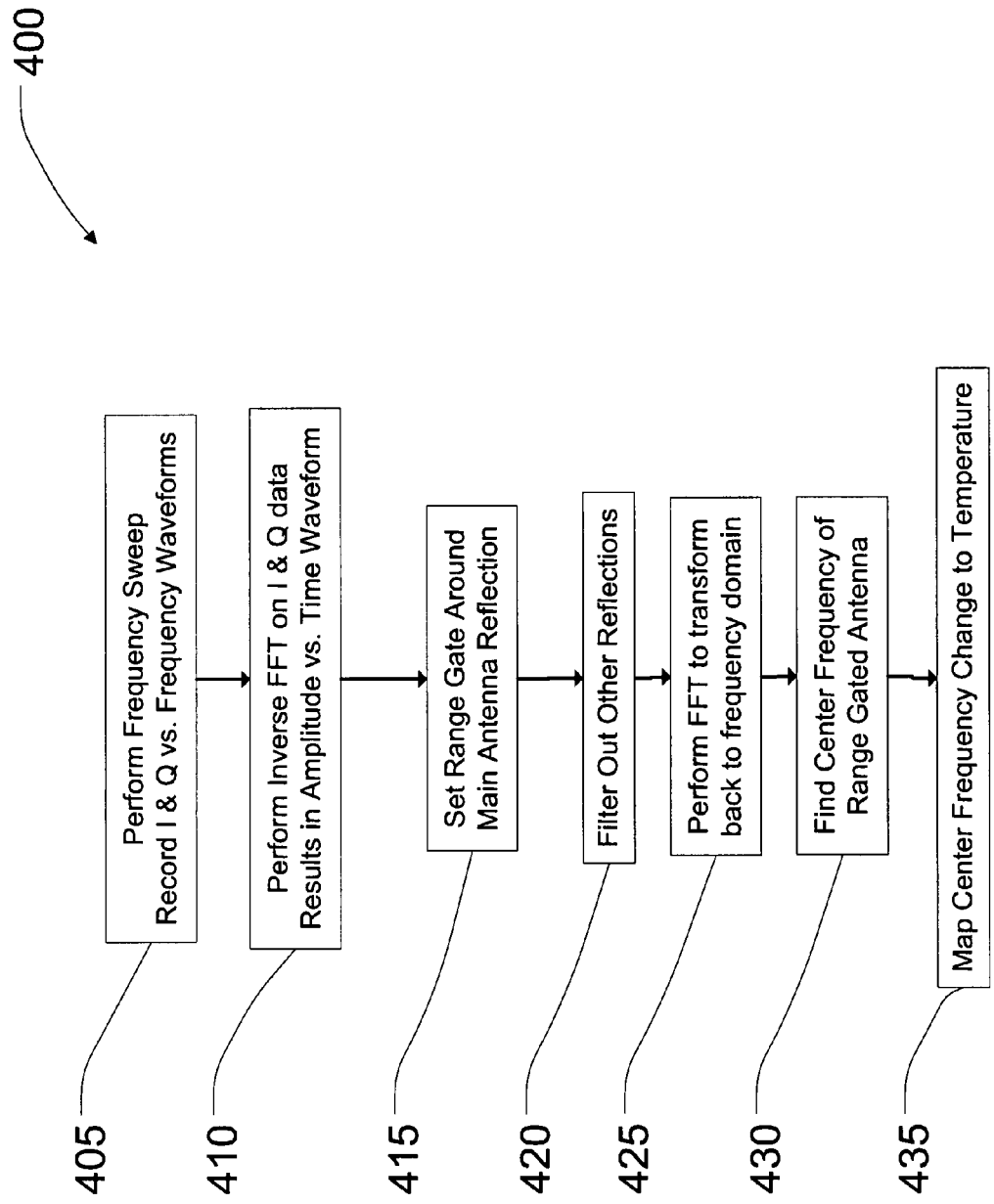
FIG. 4 is a flow chart diagram of a process for measuring the temperature by calculating a reflection coefficient, or S11 plot, for an antenna placed within a high temperature environment in accordance with one embodiment of the present invention.
Figure 5:
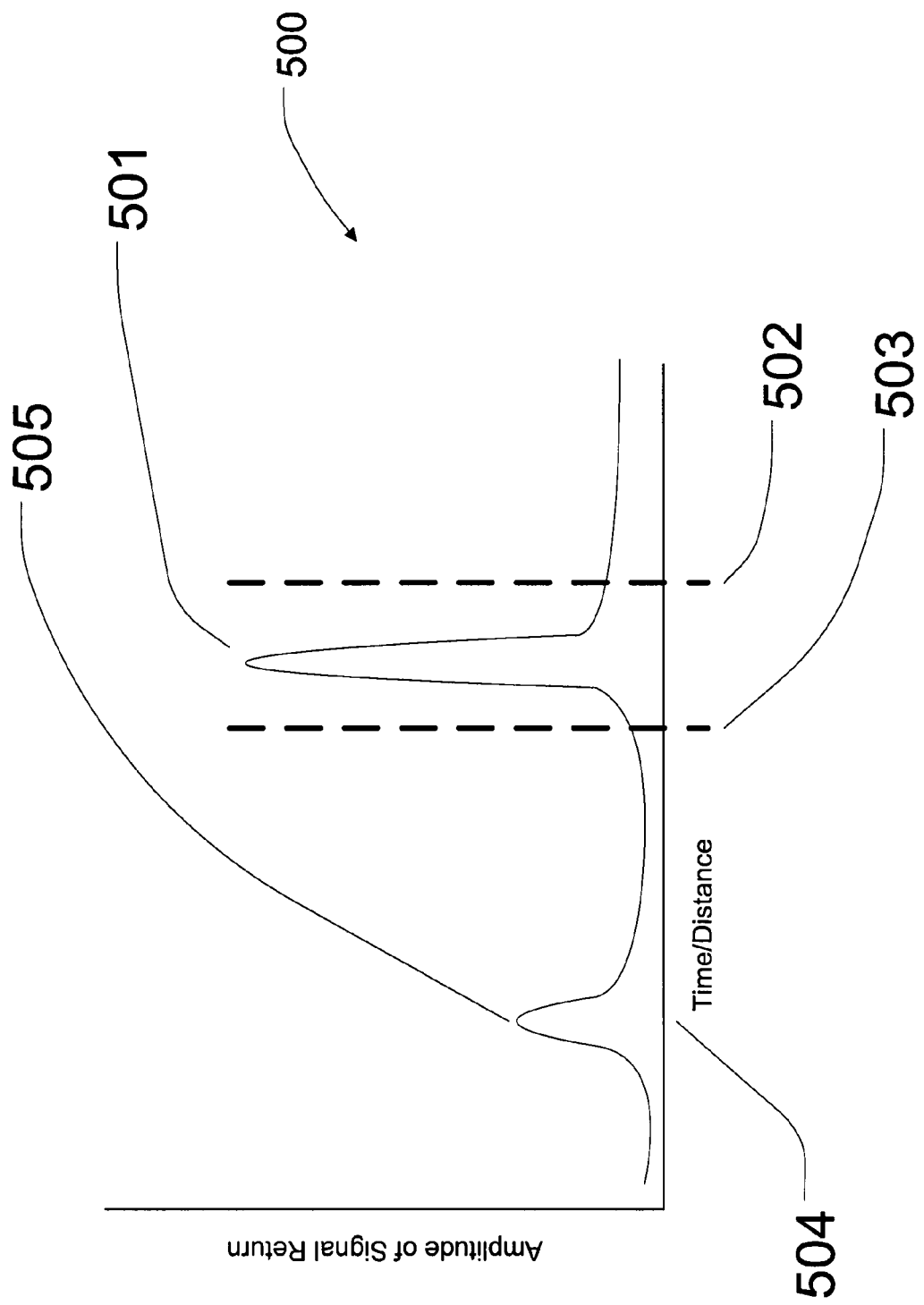
FIG. 5 is a representative graph showing reflections down the length of a cable and the application of a range gate upon the antenna reflection in accordance with one embodiment of the present invention.

Exemplary embodiments of the present invention will now be described more fully hereinafter with reference to FIGS. 1-5, in which embodiments of the invention are shown. FIG. 1a is the top view of an exemplary implementation of a patch antenna with metallization applied using a thick film or thin film process in accordance with one embodiment of the present invention. FIG. 1b is the side view of an exemplary implementation of a patch antenna with metallization applied using a thick film or thin film process in accordance with one embodiment of the present invention. FIG. 2 is a system block diagram illustrating a representative measurement system comprising microwave electronics with digital signal processing attached to a cable and antenna in accordance with one embodiment of the present invention. FIG. 3 is a typical reflection coefficient plot for a typical patch antenna in accordance with one embodiment of the present invention. FIG. 4 is a flow chart diagram of a process for measuring the temperature by calculating a reflection coefficient, or S11 plot, for an antenna placed within a high temperature environment in accordance with one embodiment of the present invention. FIG. 5 is a representative graph showing reflections down the length of a cable and the application of a range gate upon the antenna reflection in accordance with one embodiment of the present invention.

This invention can be embodied in many different forms and should not be construed as limited to the embodiments set forth herein; rather, these embodiments are provided so that this disclosure will be thorough and complete, and will fully convey the scope of the invention to those having ordinary sill in the art. Furthermore, all representative "examples" given herein are intended to be non-limiting, and among others supported by exemplary embodiments of the present invention.

FIG. 1 shows an exemplary patch antenna 100 comprising a dielectric substrate 102, a high temperature metallization 101 and a feed hole 103 for placing a microwave cable. The dielectric substrate 101 is typically a high temperature ceramic material, such as Coors AD995, which is a 99.5% pure alumina ceramic with a room temperature dielectric constant of approximately 9.7. At temperatures of 800° C., the dielectrics constant can rise to over 11. In other words, the dielectric constant of a dielectric material typically increases with an increase in temperature. The patch antenna 100 is a representative example of an antenna that can be used to support the measurement of a temperature in a high temperature environment.

As those versed in the art will know, the size of the microstrip patch antenna 100 is inversely related to the dielectric constant of the material used for the substrate 101 given a constant transmit frequency. For example, designing an antenna with a center frequency of approximately 5.8 GHz would yield a microstrip patch 100 of approximately 0.350 inches in diameter when using a Coors AD995 material. There are other high temperature materials that can be used as dielectric substrate 101, including but not limited to titania, zirconia, and silicon dioxide. Any material can be used as dielectric substrate 101 provided that the material has a dielectric constant compatible with the microwave design and the material properties are such that the substrate will survive in the application. For example, Coors AD995 will survive in high temperature applications exceeding 2000° F.

There are additional ceramics available for use as the dielectric substrate 101 that add titania or calcium oxide additives to an alumina formula; these materials are known to significantly reduce the dielectric constant change as a function of temperature. Exemplary embodiments of the invention use these materials to minimize the change in antenna center frequency as a function of temperature.

The high temperature metallization 101 is a metal that is applied to dielectric substrate 102. Although the dielectric substrate 102 is capable of withstanding very high temperatures with high survivability in corrosive environments, the metallization 101 can be vulnerable over longer exposures. Materials include platinum-palladium-silver, rhenium, elemental platinum, and even conductive ceramics such as indium tin oxide. The geometry of the metallization 101 can be of any standard antenna design. To date, exemplary designs include a circular path or variants of a circular path, including a U-slot patch and a straight slot patch. Any geometry that achieves the desired center frequency and bandwidth could be used to implement the metallization.

The feed to the antenna 100 is through hole 103. In exemplary designs, the center conductor of a coaxial cable is fed through hole 103 and bonded to metallization 101 using a braze, TIG welding, laser welding, or any other metal-to-metal joining technique, as known to those versed in the art. The antenna could be fed using a pin rather than a coaxial cable, or the feed could be redesigned to accommodate any other type of patch antenna feed found in the prior art.

The exemplary patch antenna can operate in support of transmission and reception of electromagnetic signals, while exposed to high temperatures, based on a selection of high temperature materials to prevent melting, oxidation, or chemical attack, as described above in connection with FIG. 1. High temperature joining techniques, such as brazing or diffusion bonding, are typically used to join components of the patch antenna.

Although an exemplary embodiment uses a patch antenna for temperature measurement applications, the inventors recognize that other resonant structures using a dielectric material could be used as well for such applications. These resonant structures include, for example, dielectric materials such as dielectric windows or waveguide-filled dielectric antennas, and any other resonant structure that is loaded with a dielectric material.

FIG. 2 shows a block diagram of an exemplary measurement system to measure temperature from the dielectric constant change of a patch antenna operating in a high temperature environment. The exemplary measurement system comprises a probe body 201 that houses the patch antenna 100 based on the placement of the antenna within the interior of the probe. The probe body 201 houses the antenna 100 and is typically designed is to match the geometry of the desired installation site. For example, the probe body 201 may have threads, flanges, cutouts, or any other mechanical features necessary to aid installation for the particular application. The probe body 201 is connected to electronics embodied by a microwave transceiver 203, typically a network analyzer, via a high temperature cable 202.

The microwave transceiver 203 comprises electronics for generating microwave signals for propagation down the cable 202 to the antenna 100 and demodulating the reflected signal. In the preferred embodiment, a network analyzer, such as Agilent 8722 would be used, however, typical zero-IF receiver architecture or any other standard microwave receiver such as digital IQ or a super-heterodyne receiver may be used. A requirement of the receiver component of the transceiver 203 is that it is capable quadrature measurement, which allows the receiver to measure both magnitude and phase of the received signal. As those versed in the art know, there are a variety of microwave receiver techniques that can measure the amplitude and phase of the received signal, all of which may be used. Transceiver 203 is also capable of changing the transmit frequency over a large bandwidth, preferably 500 MHz or larger.

The measurement system also comprises analog or digital signal processing 204 useful for calculating the reflection coefficient, also referred to as the S11. As those versed in the art know, S11 is the ratio of the received signal to the transmitted signal and can further be explained as the ratio of the received signal divided by the transmitted signal. This signal processing functionality is best embodied in a network analyzer, such as an Agilent 8722. S11 can be measured over a wide frequency range, generating a plot of S11 vs. frequency for display on a display screen or presentation in a report. For a typical patch antenna, the point at which the least amount of energy is reflected back represents the center frequency of the antenna.

The signal processing 204 is capable of performing time gating on a signal. For example, the signal processing 204 can perform inverse Fourier transforms using a fast inverse Fourier transform (IFFT), Fourier transforms embodied within a fast Fourier transform (FFT) algorithm, and other simple math operations. The application of signal processing to the temperature measurement method will be further explained in FIGS. 4 & 5.

Signal processing 204 is also capable of calculating the minimum point on the S11 magnitude plot using simple mathematical operations. An exemplary method of how this operation would be performed would be to store all of the S11 magnitude values within the signal processor's memory as an array and then perform a loop (such as a for loop in C) looking for the minimum value in the array. As the loop indexes through each array position a comparison is made between the current S11 value at that index and the global minimum found to date. If the current value is less than the global minimum, the global minimum is replaced with the new minimum value, and the index at which that value occurs is stored as well. The entire array is then indexed until the global minimum value and index at which that value occurs is found. The signal processor stores a mapping of the frequency values for each S11 value index. In this manner, through a simple look up table, the index can be used to find the frequency at which the minimum S11 value occurs. In addition, signal processing 204 is capable of storing a calibration curve that maps the center frequency of the antenna to the temperature of the dielectric constant. The calibration curve can be generated by placing the antenna within an oven and raising the temperature while recording both the temperature inside the oven along with the center frequency of the antenna using a network analyzer. An exemplary process for generating the calibration curve would be to first place a thermocouple within the oven, and then place the probe within the oven. The lead wire of the probe would exit a port in the oven and be attached to a network analyzer. A data acquisition system would then be hooked to the network analyzer that would record and store the minimum S11 value over time. The ability to control the network analyzer from an external computer and run math functions like finding the minimum S11 value are standard functions within modern network analyzers. GBIP, or other supported communication protocols can be used to control the network analyzer from the computer. While the computer is recording the minimum S11 value and corresponding frequency from the network analyzer over time, the oven is ramped up in the maximum expected value in the engine. When completed, an X-Y graph plotting the temperature versus center frequency can be generated and a curve fit to the plot. Any standard curve fitting technique can be used such as linear interpolation, polynomial fit, or spline fit can be used. The resulting curve fit becomes the calibration used to map the center frequency to the temperature.

An output of the temperature measurement can be presented to the user 205. Typical outputs include a screen display or report, digital output to another data acquisition device via Ethernet, RS-232, RS-485, MODBUS, or other similar digital protocol, an analog output such as a voltage proportional to temperature, or a current proportional temperature.

FIG. 3 is a reflection coefficient plot showing an exemplary S11 plot 300. The curve 302 is charted as a function of frequency vs. frequency for a typical patch antenna, such as the antenna 100. The S11 plot 300 shows the characteristic dip in the plot at the antenna center frequency 301. Other resonant dielectric structures, such as dielectric windows, dielectric-filled waveguides, and other dielectric-loaded structures would have similar S11 plots. As the antenna heats up in a high temperature environment, the dielectric constant will in increase for most dielectric materials. For an alumina ceramic such as Coors AD-995 the dielectric constant can raise from 9.7 to 11 as a result of a temperature increase. As the dielectric constant increases in value, the electromagnetic waves become compressed and the patch antenna looks electrically larger. The impact on the antenna resonance is to lower the resonance frequency for the patch antenna. As the temperature increases and the antenna resonance frequency decreases, the S11 plot changes as is shown in curve 304 with a lower antenna center frequency 303. As the temperature continues to be raised in the operating environment of the patch antenna, the curve 304 will continue to move to lower frequencies.

In view of the foregoing, one can appreciate that a change in resonance frequency for an antenna is associated with the application of an increasing temperature to the dielectric material of that antenna. In other words, a relationship exists between a change in resonance frequency for an antenna and a change in temperature for the operating environment of the antenna.

FIG. 4 shows a flow chart diagram of an exemplary process 400 for calculating a temperature for an operating environment of an antenna. The first step 405 comprises using the electronics, such as a network analyzer, to sweep the transmit frequency of the antenna and thereafter recording the resulting data of in-phase and quadrature waveforms for the returned signal. The in-phase and quadrature waveforms can be generated using known coherent transceiver methods, so long as magnitude and phase can be extracted from the returned signal. Next, as shown in 410, a complex inverse Fourier transform is performed on the recorded data to transform the voltage versus frequency data from the frequency domain to the time domain. To reduce side lobes, standard Fourier transform windowing can be performed on the recorded data. In the preferred embodiment, a Kaiser window can be applied to this data. The data resulting from an application of the Fourier transform represents the magnitude and phase versus time for the various reflections in the system. The operations of step 410 are described in more detail below in connection with FIG. 5.

Once the data is in the time domain, the next step, 420, is to select the antenna reflection of interest and to "zero-out" the other reflections. The resulting data is then transformed back into the frequency domain via step 425, resulting in the reflection coefficient S11 for the antenna (with all other reflections removed). The disclosed application of the "time gate" prevents the incorporation of all reflections in the system and cable in the reflection coefficient measurement, which can significantly distort the desired antenna response and give an erroneous result.

The next task at step 430 comprises detecting the minimum point of the S11 response. This can be performed through an array search to find the minimum value of the reflection coefficient S11 and to note the frequency associated with the detected minimum value. The final step, 435, involves applying a calibration map of center frequency to temperature. The calibration curve or map is developed by measuring the antenna center frequency for the antenna of interest within an oven, as was previously discussed, based on an application of increased temperatures to the antenna.

FIG. 5 shows an exemplary reflection versus time plot, similar to the plot that would be generated in step 410 of the exemplary process 400. The plot 500 shows two reflections in the system 501 and 505. The first reflection 505 is likely a signal reflection generated by a microwave connector in a coaxial cable, kink in the cable, or another part of the antenna system. Multiple reflections may occur depending on the length of the cable and the number of connectors in the antenna system. In plot 500, the reflection 501 is the reflection generated by the antenna. This reflection is range-gated by selecting the reflection of interest. In this case, the reflection 501 is marked by the boundary lines 502 and 503. Any reflections outside of these bands are set to zero before the data is transformed from the time domain to the frequency domain via a Fourier transform. It will be understood that the plot 500 shows only the magnitude of a complex set of data. When performing Fourier transforms, however, the phase data should be included in the transformation, as known to those versed in the art.

What is claimed is:

1. A method for calculating a temperature in a high temperature environment, comprising the steps of
using an electromagnetic signal source to output an electromagnetic signal with a transmit frequency range of an antenna operating in the high temperature environment, the antenna characterized by a range of different center frequencies for different operating temperatures;
receiving at a receiver a returned signal representing reflection characteristics of the antenna within the transmit frequency range;
using a signal processing component to generate a frequency to time transformation to in-phase and quadrature waveforms extracted from the returned signal to generate resultant data representing the magnitude and phase characteristics in the time domain for reflections associated with the returned signal;
generating a response curve for a reflection coefficient for the antenna by using the signal processing component to provide a time to frequency transform to a portion of the resultant data comprising a reflection associated with the center frequency of the antenna;
identifying a minimum point of the response curve by use of the signal processing component to detect the center frequency for the antenna;
applying via the signal processing component a calibration map to the minimum point to identify a temperature associated with the center frequency of the antenna; and
providing a display presenting the temperature associated with the center frequency of the antennas the temperature of the high temperature environment.

2. The method of claim 1, wherein the antenna comprises a resonant structure that is loaded with a dielectric material having a dielectric constant that increases with an increase of temperature in the high temperature environment.

3. The method of claim 1 further comprising the step of removing certain resultant data representing reflection characteristics associated with an object other than the antenna in the high temperature environment, prior to applying the time to frequency transform to the portion of the resultant data, to insure that the reflection coefficient is associated with the antenna.

4. The method of claim 3, wherein the step of removing the certain resultant data comprises using the signal processing component to apply time gating to the resultant data, thereby achieving a zero-out of the reflection characteristics associated with the object.

5. The method of claim 1, wherein the antenna comprises a patch antenna comprising a dielectric substrate having a dielectric constant that increases with an increase of temperature in the high temperature environment.

6. The method of claim 5, wherein a probe body houses the patch antenna and is installed for operation within the high temperature environment.

7. A method for calculating a temperature in a high temperature environment, comprising the steps of
using a network analyzer connected to an antenna operating in the high temperature environment to generate a response curve for a reflection coefficient associated with the antenna by completing a frequency to time transformation for in-phase and quadrature waveforms extracted from a returned signal reflected from the high temperature environment and characterized by reflection characteristics of the antenna to generate resultant data representing the magnitude and phase characteristics in the time domain for reflections associated with the returned signal, and applying a time to frequency transform to a portion of the resultant data comprising a reflection associated with the resonant frequency of the antenna to generate the response curve;
identifying a minimum point of the response curve to detect the resonant frequency for the antenna;
applying a calibration map to the minimum point to identify a temperature associated with the resonant frequency of the antenna; and
providing the temperature associated with the resonant frequency of the antenna as the temperature of the high temperature environment.

8. The method of claim 7, wherein the antenna comprises a resonant structure that is loaded with a dielectric material having a dielectric constant that increases with an increase of temperature in the high temperature environment.

9. The method of claim 7 further comprising the step of removing certain resultant data representing reflection characteristics associated with an object other than the antenna in the high temperature environment, prior to applying the time to frequency transform to the portion of the resultant data.

10. The method of claim 9, wherein the step of removing the certain resultant data comprises using the network analyzer to apply time gating to the resultant data, thereby achieving a zero-out of the reflection characteristics associated with the object.

11. The method of claim 7, wherein the antenna comprises a patch antenna comprising a dielectric substrate having a dielectric constant that increases with an increase of temperature in the high temperature environment.

12. The method of claim 11, wherein a probe body houses the patch antenna and is installed for operation whiten the high temperature environment.

13. An apparatus for calculating a temperature in a high temperature environment, comprising:
a network analyzer for generating a response curve for a reflection coefficient associated with a probe body comprising a resonant structure operating in the high temperature environment, the analyzer comprising signal processing logic to generate the response curve by completing a frequency to time transformation for in-phase and quadrature waveforms extracted from a returned signal reflected from the high temperature environment and characterized by reflection characteristics of the resonant structure to generate resultant data representing the magnitude and phase characteristics in the time domain for reflections associated with the returned signal, and to apply a time to frequency transform to a portion of the resultant data comprising a reflection associated with the resonant frequency of the resonant structure to generate the response curve; and
a computer, coupled to the network analyzer, for identifying a minimum point of the response curve to detect the resonant frequency for the resonant structure,
the computer further operative to apply a calibration map to the minimum point to identify a temperature associated with the resonant frequency of the resonant structure,
wherein the computer provides the temperature associated with the resonant frequency of the resonant structure as the temperature of the high temperature environment.

14. The system of claim 13, wherein the resonant structure comprises an antenna that is loaded with a dielectric material having a dielectric constant that increases with an increase of temperature in the high temperature environment.

15. The system of claim 13, wherein the computer is further operative to remove certain resultant data representing reflection characteristics associated with an object other than the resonant structure in the high temperature environment, prior to generating the response curve.

16. The system of claim 15, wherein the computer removes the certain resultant data by applying time gating to the resultant data, thereby achieving a zero-out of the reflection characteristics associated with the object.

17. The system of claim 13, wherein the resonant structure comprises a patch antenna comprising a dielectric substrate having a dielectric constant that increases with an increase of temperature in the high temperature environment.

18. The system of claim 17, wherein the probe body houses the patch antenna and is installed for operation within the high temperature environment.

* * * * *